(12) United States Patent
Kim et al.

(10) Patent No.: US 10,356,683 B2
(45) Date of Patent: Jul. 16, 2019

(54) METHOD AND DEVICE FOR PRESERVING MOBILITY INFORMATION IN TERMINAL STATE TRANSITION AND EFFECTIVELY RE-ACCESSING IN HETEROGENEOUS CELL NETWORK IN MOBILE COMMUNICATION SYSTEM

(71) Applicant: Samsung Electronics Co., Ltd, Suwon-si (KR)

(72) Inventors: Woo Seong Kim, Gwacheon-si (KR); Soeng Hun Kim, Suwon-si (KR); Sang Bum Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/894,709

(22) Filed: Feb. 12, 2018

(65) Prior Publication Data

US 2018/0242217 A1 Aug. 23, 2018

Related U.S. Application Data

(63) Continuation of application No. 14/388,780, filed as application No. PCT/KR2013/002509 on Mar. 26, 2013, now Pat. No. 9,894,588.

(Continued)

(51) Int. Cl.
*H04W 8/02* (2009.01)
*H04W 8/08* (2009.01)
(Continued)

(52) U.S. Cl.
CPC ............. *H04W 36/32* (2013.01); *H04W 8/02* (2013.01); *H04W 8/08* (2013.01);
(Continued)

(58) Field of Classification Search
CPC ......................... H04W 36/0055; H04W 36/32; H04W 88/02; H04W 88/08; H04W 8/02; H04W 60/00; H04W 84/045; H04W 8/08
See application file for complete search history.

(56) References Cited

U.S. PATENT DOCUMENTS

| 8,767,723 B2 | 7/2014 | Lee et al. |
| 9,591,502 B2 | 3/2017 | Fu et al. |
| (Continued) | | |

FOREIGN PATENT DOCUMENTS

| CN | 101595752 A | 12/2009 |
| CN | 101651878 A | 2/2010 |
| (Continued) | | |

OTHER PUBLICATIONS

Office Action dated Jun. 11, 2018 in connection with Japanese patent Application No. 2017-111875.
(Continued)

*Primary Examiner* — Kashif Siddiqui

(57) ABSTRACT

The present invention pertains to a method and device for preserving mobility information in terminal state transition and effectively re-accessing in a heterogeneous cell network in a mobile communication system. A method for estimating a mobility state of a terminal in a mobile communication system according to one embodiment of the present invention may comprise the steps of: receiving, by the terminal, system information from a serving cell during an idle state; calculating mobility state information by using the received system information; storing the mobility state information; and transmitting the mobility state information to a base station when the terminal is connected to the base station. According to one embodiment of the present invention, when an idle state of a terminal is changed to a connection
(Continued)

state in a mobile communication system, a mobility state of the terminal can be more effectively estimated.

16 Claims, 11 Drawing Sheets

Related U.S. Application Data

(60) Provisional application No. 61/615,856, filed on Mar. 26, 2012.

(51) Int. Cl.
*H04W 36/00* (2009.01)
*H04W 36/32* (2009.01)
*H04W 88/02* (2009.01)
*H04W 88/08* (2009.01)

(52) U.S. Cl.
CPC ........ *H04W 36/0055* (2013.01); *H04W 88/02* (2013.01); *H04W 88/08* (2013.01)

(56) References Cited

U.S. PATENT DOCUMENTS

| | | | |
|---|---|---|---|
| 9,894,588 B2* | 2/2018 | Kim | H04W 8/02 |
| 2007/0104166 A1* | 5/2007 | Rahman | H04W 36/32 |
| | | | 370/338 |
| 2011/0026484 A1 | 2/2011 | Fox et al. | |
| 2011/0086635 A1* | 4/2011 | Grob-Lipski | H04W 36/32 |
| | | | 455/423 |
| 2011/0092217 A1 | 4/2011 | Kim et al. | |
| 2011/0143745 A1 | 6/2011 | Wang et al. | |
| 2011/0281578 A1 | 11/2011 | Narasimha et al. | |
| 2012/0088509 A1 | 4/2012 | Vi | |
| 2012/0314640 A1 | 12/2012 | Kim et al. | |
| 2013/0088980 A1 | 4/2013 | Kim et al. | |

FOREIGN PATENT DOCUMENTS

| | | |
|---|---|---|
| CN | 101909322 A | 12/2010 |
| CN | 102300248 A | 12/2011 |
| CN | 102754470 A | 10/2012 |
| EP | 2315491 A1 | 4/2011 |
| EP | 2070363 B1 | 12/2011 |
| EP | 2426980 A1 | 3/2012 |
| JP | 2011078019 A | 4/2011 |
| JP | 2013-520917 A | 6/2013 |
| KR | 10-2010-0008232 A | 1/2010 |
| KR | 10-2011-0090813 A | 8/2011 |
| WO | 2008/040962 A1 | 4/2008 |
| WO | 2009/088710 A1 | 7/2009 |
| WO | 2010/126296 A2 | 11/2010 |
| WO | 2011/021592 A1 | 2/2011 |
| WO | 2011/105856 A1 | 9/2011 |
| WO | 2012/021138 A1 | 2/2012 |
| WO | 2013/005855 A1 | 1/2013 |

OTHER PUBLICATIONS

European Search Report issued for EP 113768392.6 dated Nov. 25, 2015, 8 pgs.
International Search Report dated Jul. 26, 2013 in connection with International Patent Application No. PCT/KR2013/002509, 5 pages.
Written Opinion of International Searching Authority dated Jul. 26, 2013 in connection with International Patent Application No. PCT/KR2013/002509, 6 pages.
Japanese Patent Office, "Notification of Reasons for Refusal," Application No. 2015-501572, dated Nov. 7, 2016, 6 pages.
State intellectual Property Office of the P.R.C., "First Office Action," Chinese Application No. 201380023013.4, dated Dec. 27, 2016, 18 pages.
Media Tek, "Reporting Pcmax," R2-113081, 3GPP TSG-RAN WG2 Meeting #74, Barcelona, Spain, May 9-13, 2011, 5 pages.
Inter Digital Communications, "PCMAX Inclusion for Inter-band PHR," R2-116105, 3GPP TSG RAN WG2 #76, Nov. 14-18, 2011, San Francisco, USA, 6 pages.
Office Action dated Sep. 5, 2017 in connection with Chinese Patent Application No. 201380023734.5.
Nokia Siemens Networks, "General considerations on new carrier types", 3GPP TSG RAN WG1 #68, Feb. 6-10, 2012, 4 pages, R1-120711.
New Postcom, "Considerations on measurement for additional carrier types", 3GPP TSG RAN WG1 Meeting #67, Nov. 14-18, 2011, 4 pages, R1-113701.
Motorola Mobility, "Reference and Synchronisation Signals in Additional Carrier Type", 3GPP TSG-RAN WG1 #68, 3 pages, R1-120515.
European Search Report dated Nov. 26, 2018 in connection with European Patent Application No. 18 19 2775, 9 pages.
Office Action dated Apr. 24, 2019 in connection with Chinese Patent Application No. 201380023734.5, 19 pages.

* cited by examiner

METHOD AND DEVICE FOR PRESERVING MOBILITY INFORMATION IN TERMINAL STATE TRANSITION AND EFFECTIVELY RE-ACCESSING IN HETEROGENEOUS CELL NETWORK IN MOBILE COMMUNICATION SYSTEM

CROSS-REFERENCE TO RELATED APPLICATIONS AND CLAIM OF PRIORITY

This application is a continuation of U.S. patent application Ser. No. 14/388,780 filed on Sep. 26, 2014, which is the 371 of International Application No. PCT/KR2013/002509 filed Mar. 26, 2013, which claims the benefit of U.S. Provisional Patent Application No. 61/615,856 filed Mar. 26, 2012, the disclosures of which are herein incorporated by reference in their entirety.

BACKGROUND

1. Field

The present invention relates to a mobility control method and apparatus for controlling mobility to a cell having a small cell service area effectively in a mobile communication system.

2. Description of Related Art

Mobile communication systems were developed to provide mobile users with communication services. With the rapid advance of technologies, the mobile communication systems have evolved to the level capable of providing high speed data communication service beyond the early voice-oriented services. Recently, standardization for a Long Term Evolution Advanced (LTE-A) system, as one of the next-generation mobile communication systems, is underway in the 3$^{rd}$ Generation Partnership Project (3GPP). LTE-A is a technology designed to provide high speed packet-based communication faster in data rate than the legacy communication technology and aims at commercial deployment around late 2010.

With the evolution of the 3GPP standard, many studies being conducted for optimization of radio networks as well as improvement of data rate. In the mobile communication system, cells having a small service area are used frequently to increase the system throughput and fill coverage holes. The deployment of the small cells is likely to cause frequent handover failure, resulting in mobility management problem. However, there is neither a measure of applying parameters nor development of operation mechanism appropriate for the small cell service area.

SUMMARY

The present invention has been proposed to solve the above problem and aims to provide a method of estimating the mobility state of the terminal more effectively when the terminal transition between the idle and connected states in the mobile communication system.

Also, the present invention aims to provide a method for a terminal to reestablish a connection promptly to an unprepared small cell of which no status information for handover of the terminal is not received from the base station.

The objects of the present invention are not limited to the aforesaid, and other objects not described herein with be clearly understood by those skilled in the art from the descriptions below.

In accordance with an aspect of the present invention, a mobility state estimation method of a terminal in a mobile communication system includes receiving system information from a serving cell in idle state, calculating mobility state information using the system information, storing the mobility state information, and transmitting the mobility state information to a base station in connecting to the base station.

In accordance with another aspect of the present invention, a terminal for estimating terminal mobility state in a mobile communication system includes a transceiver which transmits and receives signals to and from a base station and a controller which controls receiving system information from a serving cell in idle state, calculating mobility state information using the system information, storing the mobility state information, and transmitting the mobility state information to a base station in connecting to the base station.

In accordance with another aspect of the present invention, a communication method of a terminal in a mobile communication system includes transmitting a reestablishment request message including a reestablishment procedure indicator to a base station, receiving a connection accept message from the base station in response to the reestablishment request message, and transmitting a connection complete message including terminal information to the base station.

In accordance with still another aspect of the present invention, a communication method of a base station in a mobile communication system includes receiving a reestablishment request message, determining whether the reestablishment message includes a reestablishment procedure indicator, transmitting, when the reestablishment request message includes the reestablishment procedure indicator, a connection accept message to a terminal, transmitting, when the reestablishment request message includes the reestablishment procedure indicator, a connection reject message to the terminal, and receiving a connection complete message including terminal information.

The mobility control method and apparatus of the present invention is advantageous in terms of estimating the mobility state of a terminal more effectively in such a way that the terminal performs a procedure of maintaining and updating the mobility information estimated in the idle state when transitioning to the connected state and reports the terminal (UE) mobility history information to the base station when transitioning from the idle state to the connected state.

Also, the mobility control method and apparatus of the present invention is advantageous in terms of reestablishing a connection promptly to an unprepared small cell of which state information for handover of the terminal is not received from the base station.

The advantages of the present invention are not limited to the aforesaid, and other advantages not described herein with be clearly understood by those skilled in the art from the descriptions below.

DETAILED DESCRIPTION

Detailed description of well-known functions and structures incorporated herein may be omitted to avoid obscuring the subject matter of the present invention. Exemplary embodiments of the present invention are described with reference to the accompanying drawings in detail. Further, the following terms are defined in consideration of the functionality in the present invention, and may vary according to the intention of a user or an operator, usage, etc. Therefore, the definition should be made on the basis of the overall content of the present specification.

The present invention relates to a method and apparatus for controlling mobility to the cell having a small service area effectively. Prior to explaining the present invention, a description is made of a small cell arrangement scheme. Here, the small cell may denote the cell of which service area is equal to or smaller than a predetermined size. In the following description, the cell having a small service area is referred to as 'small cell.'

Figure 1:
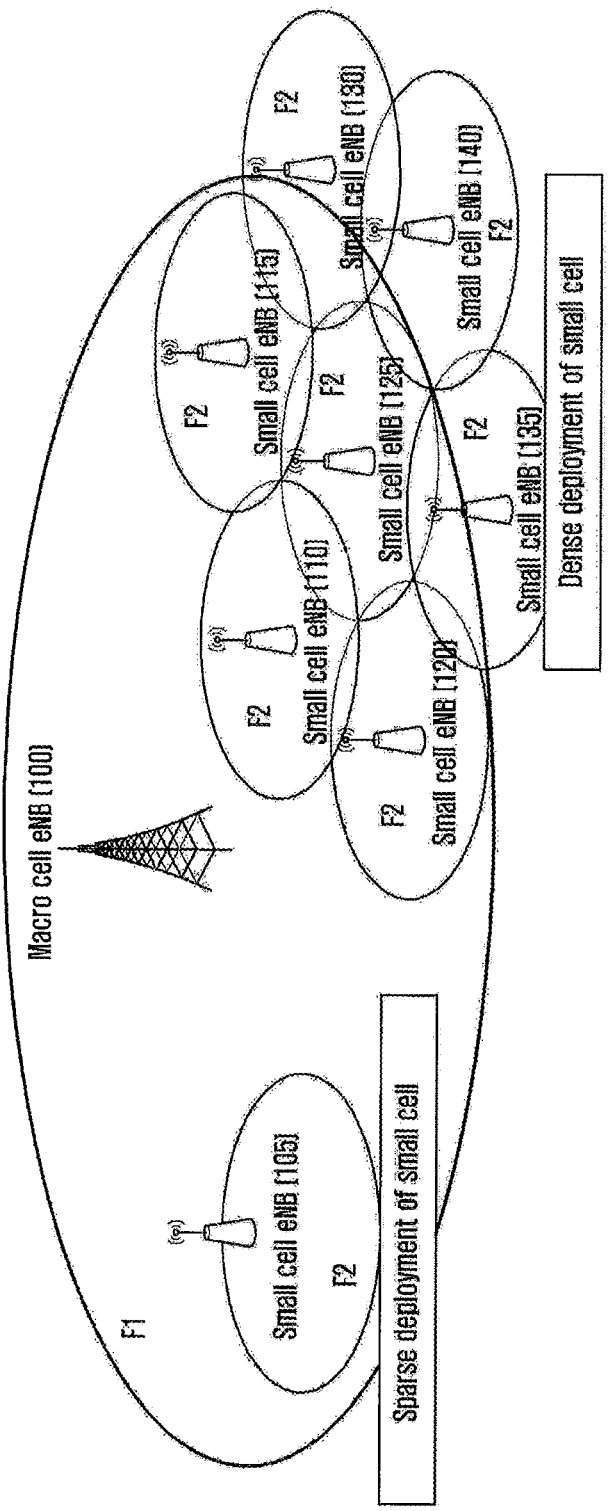
FIG. 1 is a diagram for explaining the small cell deployment scheme.

FIG. 1 is a diagram for explaining the small cell deployment scheme.

The first deployment scheme is to arrange the small cells 115 sparsely within the service area of the macro cell 110. Such deployment is advantageous to cover the hot spot on which traffics are concentrated or to fill the coverage hole. Depending on whether the small cell uses the same frequency band as the macro cell or a different one, intra-frequency handover or inter-frequency handover occurs when the terminal moves from the macro cell to the small cell or vice versa. In such deployment, the terminal may pass the small at a relatively fast speed. Due to the tiny sizes of the small cells, the terminal moving at a high speed is likely to perform handover frequently during a short period of time. This may increases the handover failure probability.

Another deployment scheme is to arrange a plurality of small cells 110, 115, 120, 125, 130, 135, and 140 adjacently close to each other. This can be applied when the large traffic occurs within a relatively broad area. The small cells may be within the service area of the macro cell or form a service area covering the range of the entire service area so as to be out of the service area of the macro cell. All of the small cells may use the same frequency band and, in this case, the terminal performs the intra-frequency handover moving between the small cells. The terminal may pass the service areas of several small cells during a short period of time.

An embodiment of the present invention is directed to a method of reconnecting to an unprepared cell when the terminal state transition, mobility information maintenance and receive power-based scaling, reselection history report, or Radio Link Failure (RLF) occurs.

Embodiment 1

The embodiment 1 of the present invention is directed to a procedure of maintaining and updating the mobility information estimated in the idle state and reporting the UE mobility history information to the base station when the terminal's operation state transitions from the idle state to the connected state.

Figure 2:
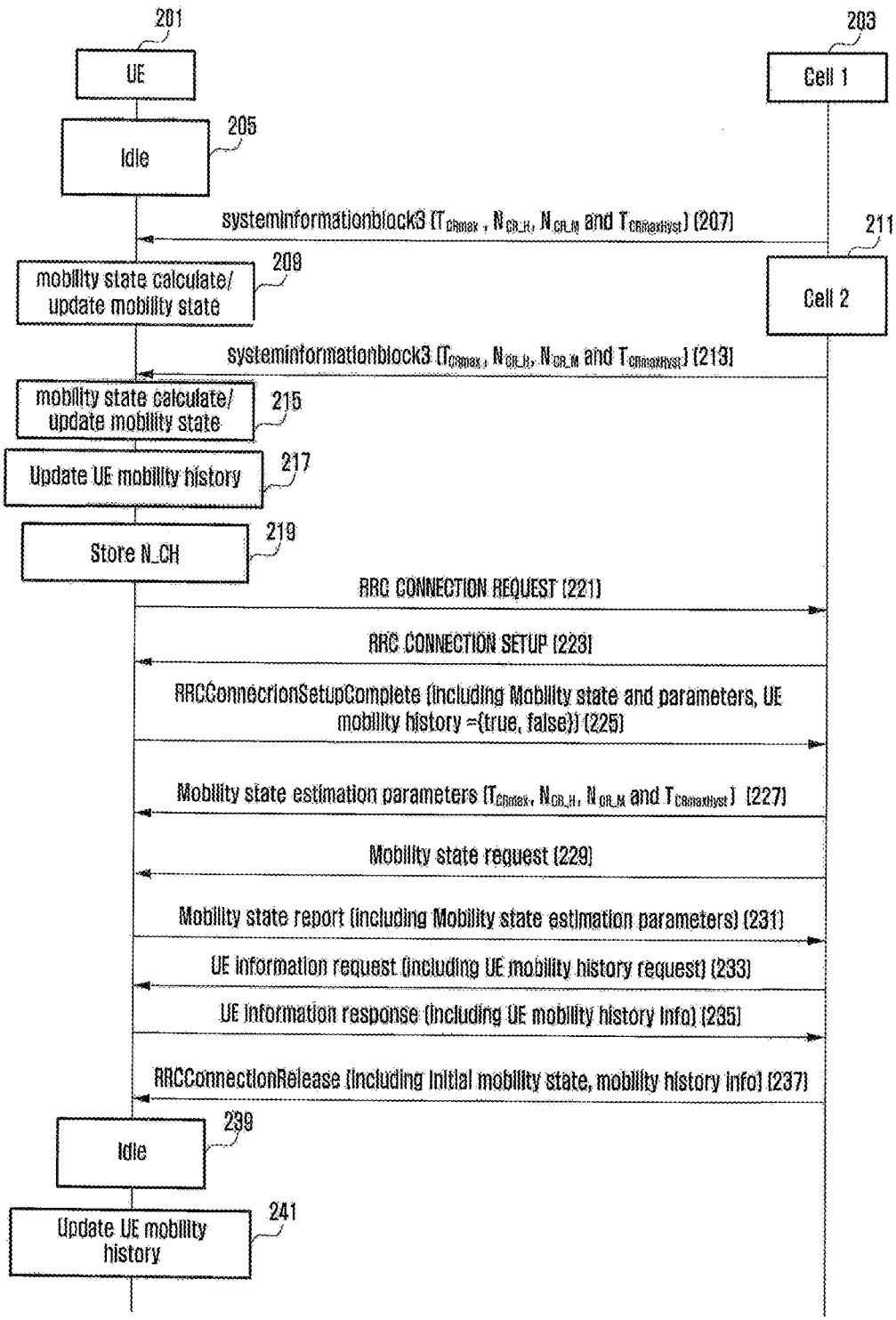
FIG. 2 is a signal flow diagram illustrating mobility state estimation procedure between the base station and the terminal according to the first embodiment of the present invention.

FIG. 2 is a signal flow diagram illustrating mobility state estimation procedure between the base station and the terminal according to the first embodiment of the present invention.

If the system information block 3 (systeminformationblock3) is received from the current serving cell, e.g. the first cell 203, the UE of which RRC connection has been released records the mobility state parameter contained in the system information block into the memory at step 207. Examples of the mobility state parameter include $T_{CRmax}$, $N_{CR\_H}$, $N_{CR\_M}$, and $T_{CRmaxHyst}$. This information is necessary for use in determining whether the UE is in high-mobility state, medium-mobility state, or normal-mobility state. For example, if the number of cell changes (or number of cell reselections) during the time $T_{CRmax}$ is greater than the parameter $N_{CR\_M}$ and less than the parameter $N_{CR\_H}$, it is determined that UE is in the medium-mobility state. If the number of cell changes (or number of cell reselections) during the time $T_{CRmax}$ is greater than $N_{CR\_H}$, it is determined that the UE is in the high-mobility state. If one of the above two states is not detected during the time $T_{CRmaxHyst}$, it may be estimated that the UE is in the normal-mobility state.

The UE may adjust the cell reselection-related parameters in association with its mobility state according to a predetermined rule. How the cell reselection parameters are adjusted is specified in 36.304.

The UE estimates its mobility state based on the above information and may update the mobility state if necessary at step 209. If the UE has its own real speed information acquired from a location measurement system such as Global Navigation Satellite System (GNSS), it may determine its mobility state using the real speed information. In order to achieve this, the network may notify the UE of the speed ranges corresponding to the respective mobility states.

The UE receives the systeminformationblock3 of the second cell 211 to update the mobility state parameter at step 213. The UE determines its mobility state using the newly updated mobility state parameter. If the mobility state parameter is updated, the UE may update the mobility state at step 215 as follows.

During the time $T_{CRmax}$ since the change of the mobility state parameter (i.e. before the mobility state is checked in the new cell or frequency), the UE maintains the mobility state of the serving cell of the previous frequency (i.e. most recent mobility state). Then the UE adjusts the sell reselection parameter by applying the mobility state of the previous frequency. That is, the UE operates in the mobility state used in the previous cell while using the cell reselection parameters (e.g. q-HystSF) received from the current cell. If $T_{CRmax}$ elapses and new mobility state is checked based on the new mobility state parameter, the UE adjusts the cell reselection parameter with the new mobility state. The newly updated mobility state parameter is used for determining the mobility state.

In the present invention, the mobility state estimation procedure can be performed in consideration of the downlink transmit (Tx) power of the cell when updating N_CH based on the number of cell reselection. Unlike the legacy method in which the N_CH increases in cell reselection procedure, the UE performs Mobility State Estimation (MSE) in such a way of applying a weight factor according to downlink (DL) Tx power. In order to achieve this, the UE acquires reference signal power (referenceSignalPower) value of the system information block 2 of the serving cell. Tables 1 and 2 shows the message formats of ASN1 including the reference signal power information carried in SIB received from the cell as specified in the standard.

TABLE 1

| -- ASN1START | |
|---|---|
| PDSCH-ConfigCommon ::= | SEQUENCE { |
| referenceSignalPower | INTEGER (−60..50), |
| p-b | INTEGER (0..3) |
| } | |
| PDSCH-ConfigDedicated::= | SEQUENCE { |
| p-a | ENUMERATED { |
| | dB-6, dB-4dot77, dB-3, dB-1dot77, |
| | dB0, dB1, dB2, dB3} |
| } | |
| -- ASN1STOP | |

TABLE 2

| PDSCH-Config field descriptions |
|---|
| p-a |
| Parameter: $P_A$, see TS 36.213 [23, 5.2]. Value dB-6 corresponds to −6 dB, dB-4dot77 corresponds to −4.77 dB etc. |
| p-b |
| Parameter: $p_B$, see TS 36.213 [23, Table 5.2-1]. |
| referenceSignalPower |
| Parameter: Reference-signal power, which provides the downlink reference-signal EPRE, see TS 36.213 [23, 5.2]. The actual value in dBm. |

The N_CH update can be performed using the reference signal power (referenceSignalPower) in consideration of the cell weight factor. For example, there may be the information on mapping the reference signal power (referenceSignalPower) range and the weight factor as configured in advance as shown in table 3.

TABLE 3

| referenceSignalPower range | Weight factor |
|---|---|
| −60 dBm~−50 dBm | 0.1 |
| −49~40 | 0.2 |
| ... | ... |
| 41~50 | x |

Also, it is possible to calculate the weight factor from the referenceSignalPower. For example, the weight factor can be calculated as following equation: Weightfactor=f(referenceSignalPower)≈m*referenceSignalPower. Here, m may be a fixed real number or a variable varying according to the value of referenceSignalPower.

The UE selects a certain cell through cell reselection with the weight factor acquired through the above two methods and then sums the weight factors in updating N_CH.

The UE performs scaling on the mobility-related parameter according to the referenceSignalPower of the target cell. The serving cell broadcasts cell-specific scaling factor (SIB 3, SIB 4, or SIB5) for specific cell among the adjacent cells. When the UE performs cell reselection to a certain neighbor cell x, it applies the value obtained by multiplying the scheduling factor acquired based on its mobility state with the scaling factor of the cell x as the final scaling factor. If no cell-specific scaling factor for cell x is signaled, it is assumed that the cell-specific scaling factor is 1.

The UE manages and updates the UE mobility history information in the idle state at step 217. In order to assist the base station to estimate the UE mobility state, the UE updates the UE mobility history based on the following information in cell reconfiguration procedure. The mobility history is provided in the form of a list of N recently connected serving cells (or a list of the serving cells where it has stayed over a predetermined time duration) and may include detailed information as follows.

cell id (e.g. ECGI, PCI, etc.); Evolved Cell Global Identifier (ECGI) is the globally unique identity of a cell in E-UTRA. PCI is used to indicate the physical layer identity of the cell (0 . . . 503)

cell reselection reason (e.g. higher priority frequency found) and channel quality of old serving cell in cell reselection procedure cell type (open CSG, etc.)

DL Tx power of cell

Cell sojourn time (difference between inbound cell reselection complete time and outbound cell reselection complete time)

If RRC connection setup necessity occurs at a certain time at step 221, the UE stores the number of cell reselections during the idle state in N_CH locally at step 219. The UE maintains the N_CH appropriately in consideration of the number of handovers. In this way, it is possible to estimate the mobility state after the connection reliably. In order to establish a connection, the UE exchanges an RRC connection request message and an RRC connection setup message with the base station at steps 221 and 223.

The UE transmits an RRC connection setup complete message at step 225 to report the mobility state it has checked. At this time, the UE can report only its mobility state to the base station. According to an embodiment, if the parameter used for mobility state estimation of the base station mismatches the parameter transmitted by the current base station, the UE may report the parameters used in determining the current mobility state, e.g. $T_{CRmax}$, $N_{CR\_H}$, $N_{CR\_M}$, and $T_{CRmaxHyst}$. According to an embodiment, the UE may report the information on whether the GNSS is activated currently and, if so, the real UE speed measured thought GNSS using the message. In the case of using GNSS, it is possible to update the mobility state promptly and improve the accuracy of the mobility state.

According to an embodiment, if the UE does not receive the parameters for the mobility state estimation in the system information block of the current cell 211 at step 213, the base station may send the UE the parameters ($T_{CRmax}$, $N_{CR\_H}$, $N_{CR\_M}$, and $T_{CRmaxHyst}$) for use in mobility state estimation of the corresponding cell through a dedicated channel.

According to an embodiment, if no UE mobility state information is received in the RRC Connection Setup Complete (RRCConnectionSetupComplete) message from the UE at step 225, the base station may request the UE for the mobility state and parameter information at step 229. The UE sends the base station the current mobility state information at step 231 and, if the parameter used for mobility state estimation mismatches the parameter transmitted by the current base station, the UE may send the parameter for use in mobility state estimation.

According to an embodiment, the UE may send the base station the RRC connection setup complete message including a Boolean (={true, false}) value indicating that the UE mobility history information is carried at step 225. If the UE has the mobility history information, the base station may send the UE a UE information request message to instruct to report the UE mobility history at step 233. The UE may transmit a UE information response message including the history information to report the UE mobility history information to the base station at step 235.

In the RRC connection release procedure, the base station sends the UE a Connection Release message at step 237. The base station may sends the UE the message including the UE initial mobility state value and UE mobility history information in the connected mode. This makes it possible to predict the mobility state effectively as compared to the legacy method of estimating the mobility state without initial value in state transition. When the value is received, the UE sets the N_CH to NCR_H for the initial value indicating the high mobility state and to NCR_M for the initial value indicating the medium mobility state. The base station may designate a predetermined N_CH value, releasing the RRC connection of the UE. Simultaneously, the UE may continue updating and managing the information according to the UE mobility history information provided by the base station at step 237 or the cell reselection state in the idle state at step 241.

Figure 3:
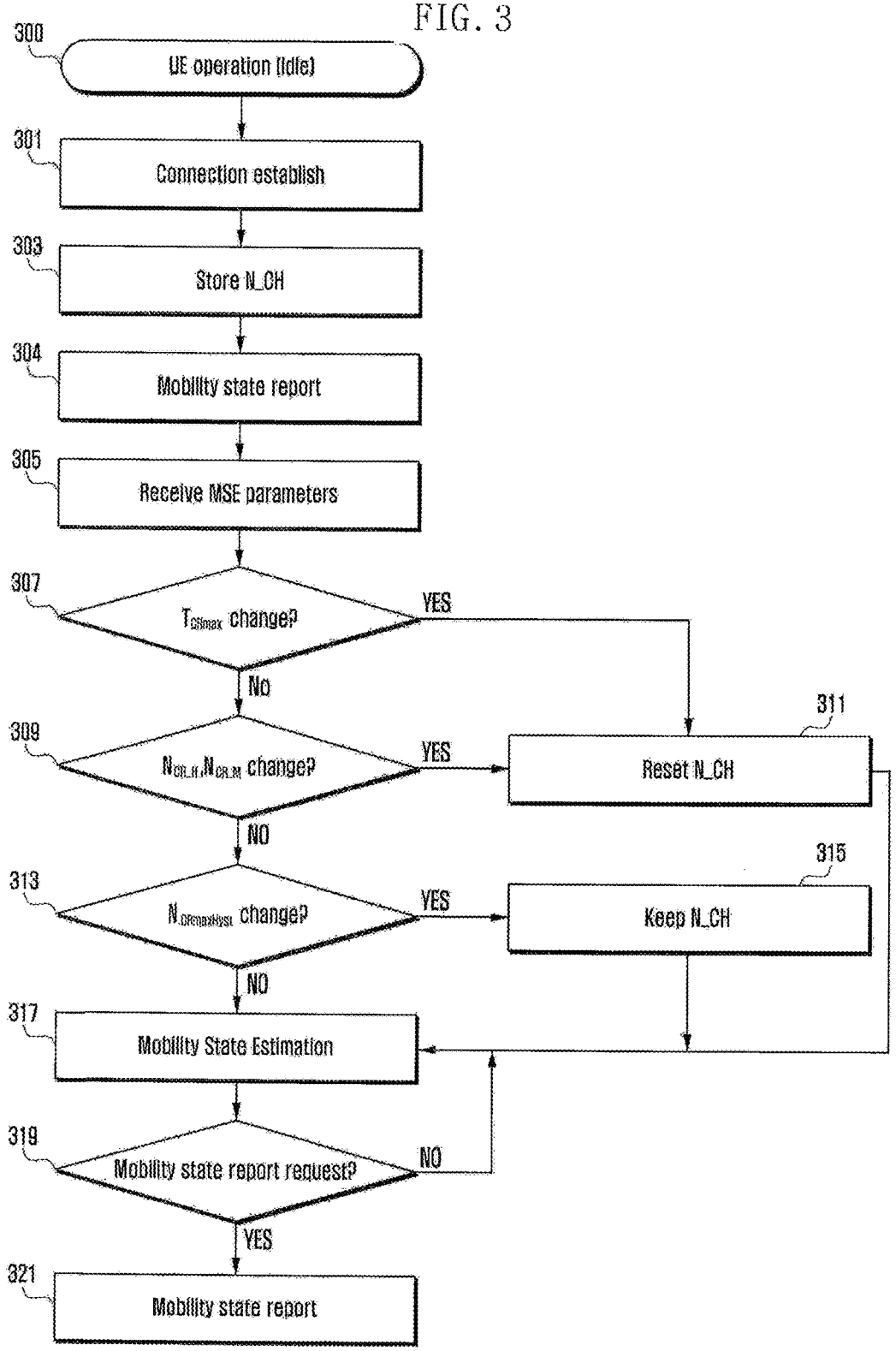
FIG. 3 is a flowchart illustrating the UE operation for mobility state estimation in transition from the idle state to the connected state according to the first embodiment.

FIG. 3 is a flowchart illustrating the UE operation for mobility state estimation in transition from the idle state to the connected state according to the first embodiment.

The UE in the idle mode acquires the mobility state parameter from the system information of the serving cell and maintains/manages the mobility state at step 300. If the UE speed is measured based on the GNSS or GPS, the UE maintains/manages the UE speed too. The UE adjusts the cell reselection parameter appropriately in consideration of the mobility state.

If RRC connection setup necessity occurs at a certain time point, the UE performs the RRC connection setup procedure in the current serving cell at step 301. In the course of the RRC connection setup procedure, the UE stores the number of cell reselections occurred during the time $T_{CRmax}$ in the previous idle state in the local variable N_CH at step 303. In the course or after the completion of the RRC connection setup, the UE may report the following information to the base station.

1. Mobility state and related information maintained in the idle state
2. Real speed of UE (only when UE knows the UE speed acquired through GNSS recently)
3. GNSS operation-related information, e.g. whether it operates currently and past operation history.

The UE receives the parameters for Mobility State Estimation (MSE) ($T_{Crmax}$, $N_{CR\_H}$ $N_{CR\_M}$, and $T_{CRmaxHyst}$) from the base station through the system information of the cell or a Dedicated RRC message at step 305. After the change of serving cell, the UE applies the value of the previous cell until the system information is acquired in the current cell. After receiving the MSE parameter, the UE determines whether the $T_{Crmax}$ has changed among the parameters at step 307. If $T_{Crmax}$ has changed, the UE initializes N_CH at step 311 and restarts mobility state estimation at step 317. If $T_{Crmax}$ has not changed at step 307, the UE determines whether $N_{CR\_H}$ and $N_{CR\_M}$ have changed among the parameters at step 309. If $N_{CR\_H}$, $N_{CR\_M}$ have changed, the UE initializes N_CH at step 311 and restarts the mobility state estimation at step 317. If $N_{CR\_H}$, $N_{CR\_M}$ have not changed at step 309, the UE determines whether $T_{CrmaxHyst}$ has changed among the parameters at step 313. If $T_{CrmaxHyst}$ has changed, the UE maintains N_CH at step 315 and re-estimates the mobility state based on the current N_CH at step 317. After restarting mobility state estimation at step 317, the UE determines whether the base station requests for new mobility state at step 319. If there is new mobility state report request, the UE may transmit the current mobility state and related information simultaneously at step 321.

Embodiment 2

Figure 4:
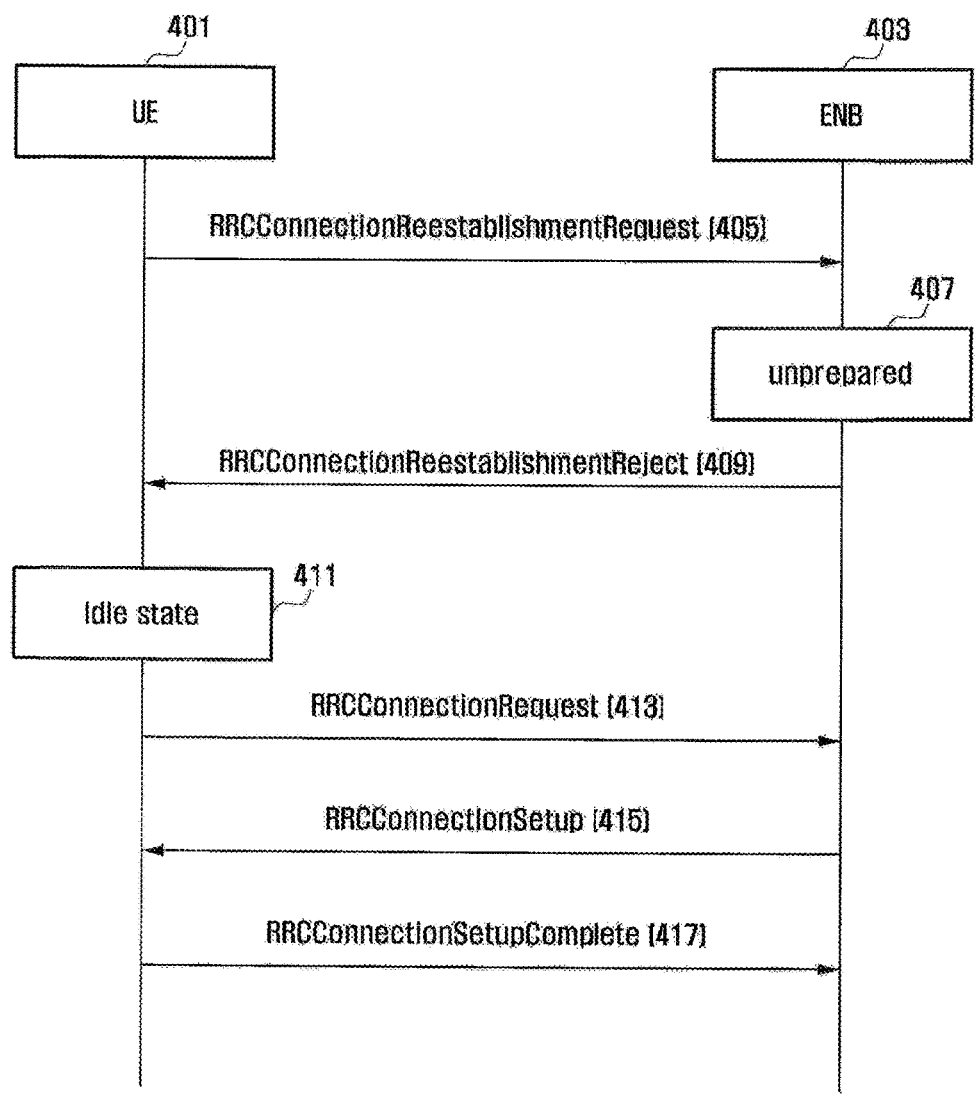
FIG. 4 is a diagram illustrating mobile UE connection to a base station according to an embodiment of the present invention.

FIG. 4 is a diagram illustrating mobile UE connection to a base station according to an embodiment of the present invention.

Referring to FIG. 4, in the case that the high mobility UE 604 moves from the macro cell and passes the small cells, the small cell service area sojourn time is short. In this case, the UE may moves to the small cell 603 without acquisition of the state context of the cell for handover of the UE from the source base station (eNB). In the present invention, the small cell of which state information for UE handover is not acquired from the source base station is referred to as 'unprepared small cell' 603. In the HetNet, the re-establishment procedure occurs more frequently, probability of reestablishment procedure to the unprepared cell is high, and Physical Cell Identifier (PCI) confusion occurrence probability is high. This causes increase of Radio Link Failure (RLF) probability. The present embodiment proposes a method for reestablishing connection to the unprepared small cell 603 promptly.

Figure 5:
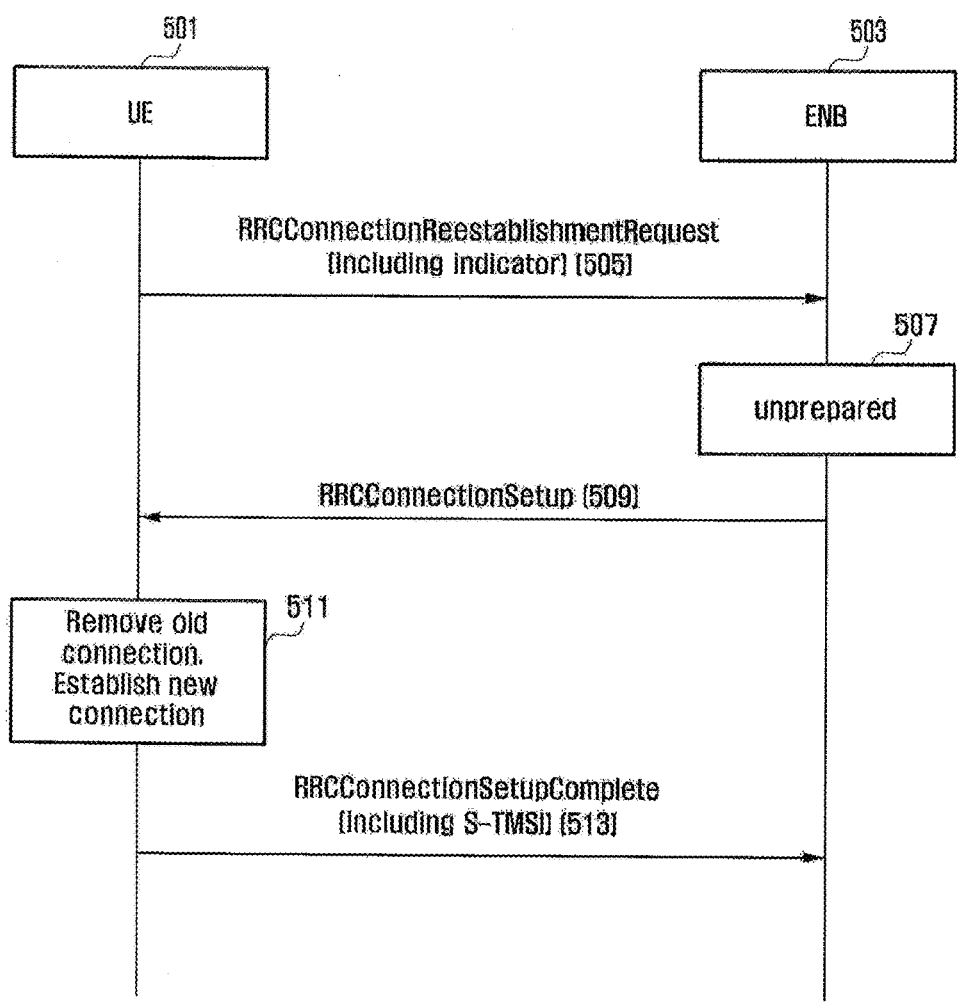
FIG. 5 is a message flow diagram illustrating the RRC connection procedure between a UE and an eNB in RLF situation.

FIG. 5 is a message flow diagram illustrating the RRC connection procedure between a UE and an eNB in RLF situation.

Referring to FIG. 5, the UE 401 performs connection reestablishment according to the conventional technology. If it is not the case for the macro cell to instruct handover to the small cell 603 as shown in FIG. 4, the small cell 603 has no context information of the UE. Accordingly, if the UE requests for connection reestablishment to the small cell having no such context information, the cell 403 rejects the reestablishment request at step 409, and the UE 401 enters the standby mode at step 411. The UE 401 sends the eNB 403 a connection request message for establishing a new RRC connection at step 413, and the eNB 403 sends the UE 401 a connection setup message at step 415. Next, the UE 401 sends the eNB 403 a connection setup complete message to complete the new RRC connection setup procedure at step 417.

Accordingly, when the UE performs the connection reestablishment to the unprepared small cell 603 other than the handover target cell after RLF in the above scenario, it fails the reestablish procedure, transitions to the idle state to perform cell selection procedure, and performs connection establishment procedure in the selected cell. In this procedure, the service is broken for considerable time, resulting in reduction of user satisfaction. In the present invention, if a new small cell is selected in RLF situation, the UE performs connection establishment procedure other than reestablishment procedure. If selected is the prepared small cell 602 other than the unprepared small cell 603, the reestablishment procedure is performed according to the legacy technology. Other than the small cells, the previous serving macro cell may be selected.

Figure 6:
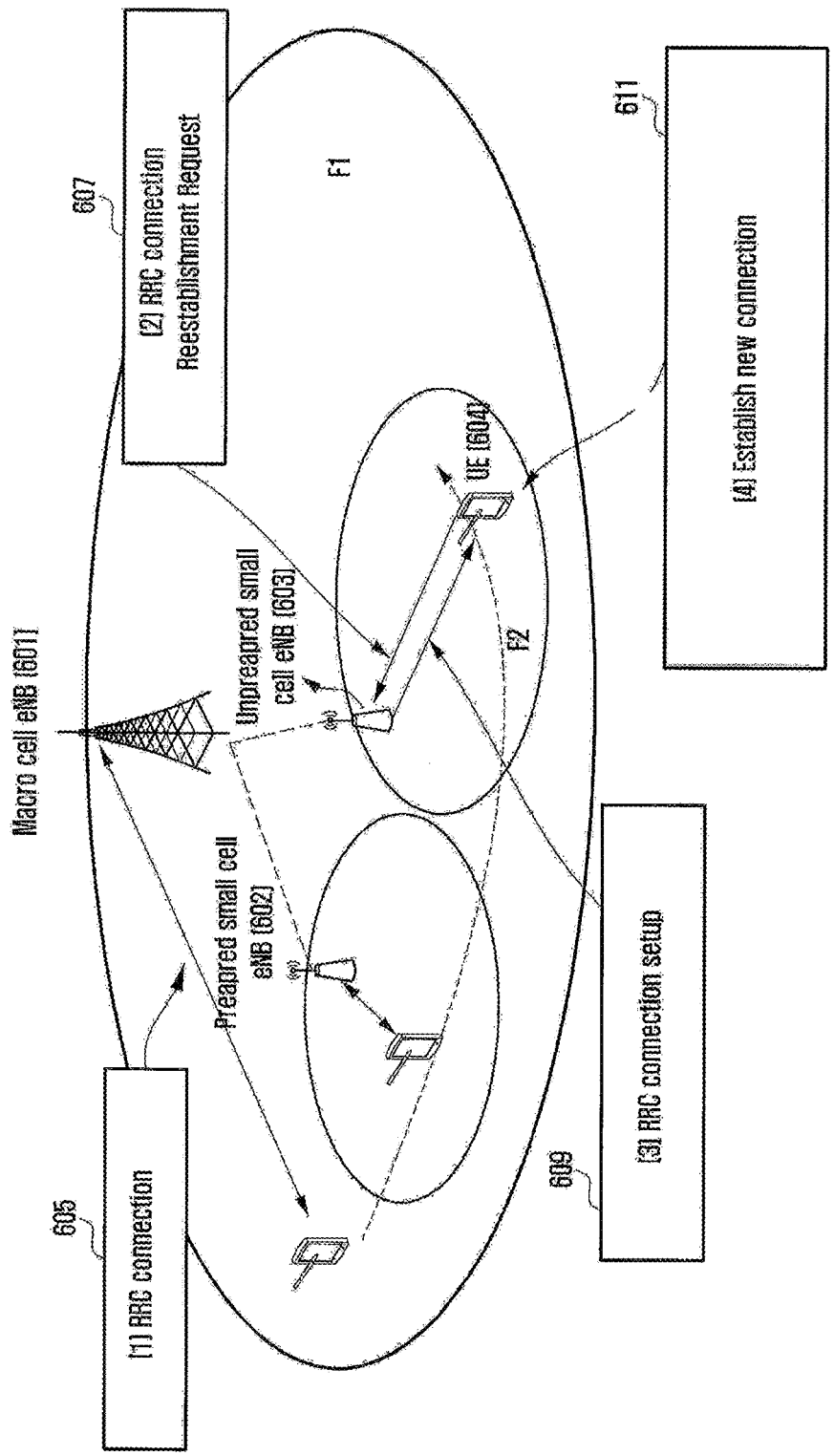
FIG. 6 is a message flow diagram illustrating RRC connection procedure between UE and eNB in RL situation according to an embodiment of the present invention.

FIG. 6 is a message flow diagram illustrating RRC connection procedure between UE and eNB in RL situation according to an embodiment of the present invention.

Referring to FIG. 6, the UE sends the unprepared small cell eNB 503 an RRC Connection Reestablishment Request (RRCConnectionReestablishmentRequest) message at step 505. The RRC Connection Reestablishment Request message may include an indicator requesting for RRC connection setup. In the unprepared state as denoted by reference number 507, the eNB sends the UE 501 an RRC Connection Setup message other than the RRC Connection Reestablishment Reject message 409 at step 509. The eNB determines whether to perform a normal RRC Connection Reestablishment procedure (procedure 1) or RRC Connection Reestablishment procedure (procedure 2) by referencing whether the RRC Connection Reestablishment Request message includes a procedure 2 indicator. The UE deletes the previous connection information according to the RRC Connection Setup message received from the small cell and establishes a new Signal Radio Bearer (SRB) at step 511. The UE sends the eNB an RRC Connection Setup Complete (RRCConnectionSetupComplete) message at step 513. In the case of the RRC Connection Setup procedure derived from the RRC Connection Reestablishment, the UE sends the eNB the RRC Connection Setup Complete message including System Architecture Evolution-Temporary Mobile Subscriber Identity (S-TMSI) of the UE and cause value.

The conventional RRC Connection Setup Complete (RRCConnectionSetupComplete) message is formatted as shown in tables 4 and 5.

RRCConnectionSetupComplete

The RRCConnectionSetupComplete message is used to confirm the successful completion of an RRC connection establishment.

Signaling radio bearer: SRB1

RLC-SAP: AM

Logical channel: DCCH

Direction: UE to E UTRAN

TABLE 4

| RRCConnectionSetupComplete message |
|---|
| -- ASN1START |
| RRCConnectionSetupComplete ::=   SEQUENCE { |
|     rrc-TransactionIdentifier   RRC-TransactionIdentifier, |
|     criticalExtensions   CHOICE { |
|         c1   CHOICE{ |
|             rrcConnectionSetupComplete-r8   RRCConnectionSetupComplete-r8-IEs, |
|         spare3 NULL, spare2 NULL, spare1 NULL |
|     }, |
|     criticalExtensionsFuture   SEQUENCE { } |
|     } |
| } |
| RRCConnectionSetupComplete-r8-IEs ::= SEQUENCE { |
|     selectedPLMN-Identity   INTEGER (1..6), |
|     registeredMME   RegisteredMME   OPTIONAL, |
|     dedicatedInfoNAS   DedicatedInfoNAS, |
|     nonCriticalExtension   RRCConnetionSetupComplete-v8a0-IEs   OPTIONAL |
| } |
| RRCConnectionSetupComplete-v8a0-IEs ::= SEQUENCE { |
|     lateNonCriticalExtension   OCTET STRING   OPTIONAL, |
|     nonCriticalExtension   RRCConnectionSetupComplete-v1020-IEs   OPTIONAL |
| } |
| RRCConnectionSetupComplete-v1020-IEs ::= SEQUENCE { |
|     gummei-Type-r10   ENUMERATED {native, mapped}   OPTIONAL, |
|     rlf-InfoAvailable-r10   ENUMERATED (true)   OPTIONAL, |
|     logMeasAvailable-r10   ENUMERATED (true)   OPTIONAL, |
|     rn-SubframeConfigReq-r10   ENUMERATED {required, notRequired}   OPTIONAL, |
|     nonCriticalExtension   SEQUENCE { }   OPTIONAL |
| } |
| RegisteredMME ::=   SEQUENCE { |
|     plmn-Identity   PLMN-Identity   OPTIONAL, |
|     mmegi   BIT STRING (SIZE (16)), |
|     mmec   MMEC |
| } |
| -- ASN1STOP |

TABLE 5

| RRCConnectionSetupComplete field descriptions |
|---|
| gummei-Type |
| This field is used to indicate whether the GUMMEI included is native (assigned by EPC) or mapped (from 2G/3G identifiers). |
| Mmegi |
| Provides the Group Identity of the registered MME within the PLMN, as provided by upper layers, see TS 23.003 [27]. |
| registeredMME |
| This field is used to transfer the GUMMEI of the MME where the UE is registered, as provided by upper layers. |
| rn-SubframeConfigReq |
| If present, this field indicates that the connection establishment is for an RN and whether a subframe configuration is requested or not. |
| selectedPLMN-Identity |
| Index of the PLMN selected by the UE from the plmn-IdentityList included in SIB1. 1 if the 1st PLMN is selected from the plmn-IdentityList included in SIB1, 2 if the 2nd PLMN is selected from the plmn-IdentityList included in SIB1 and so on. |

The RRC Connection Setup Complete (RRCConnectionSetupComplete) message may further include the information of tables 6 and 7 as well as the above information.

TABLE 6

| | |
|---|---|
| ue-Identity | InitialUE-Identity, |
| establishmentCause | EstablishmentCause, |
| InitialUE-Identity ::= | CHOICE { |
| s-TMSI | S-TMSI, |
| randomValue | BIT STRING (SIZE (40)) |
| } | |
| EstablishmentCause ::= | ENUMERATED { |
| | emergency, highPriorityAccess, mt-Access, |
| | mo-Signalling, mo-Data, |
| | delayTolerantAccess-v1020, spare2, |
| | spare1} |

TABLE 7

Additional RRCConnectionSetupComplete field descriptions establishmentCause
Provides the establishment cause for the RRC connection request as provided by the upper layers. W.r.t. the cause value names: highPriorityAccess concerns AC11 . . . AC15, 'mt' stands for 'Mobile Terminating' and 'mo' for 'Mobile Originating.
randomValue
Integer value in the range 0 to $2^{40} - 1$.
ue-Identity
UE identity included to facilitate contention resolution by lower layers.

The UE inserts Evolved Cell Global Identifier (ECGI) in the VarShortMAC-Input of the small cell in RLF situation as shown in tables 8 and 9.
VarShortMAC-Input
The UE variable VarShortMAC-Input specifies the input used to generate the shortMAC-I.

TABLE 8

VarShortMAC-Input UE variable

```
-- ASN1START
VarShortMAC-Input ::=        SEQUENCE {
    cellIdentity                 CellIdentity,
    physCellId                   PhysCellId,
    c-RNTI                       C-RNTI
    rlfECGI                      CellGlobalIdEUTRA
}
-- ASN1STOP
```

TABLE 9

VarShortMAC-Input field descriptions cellIdentity
Set to CellIdentity of the current cell.
c-RNTI
Set to C-RNTI that the UE had in the PCell it was connected to prior to the failure.
physCellId
Set to the physical cell identity of the PCell the UE was connected to prior to the failure.
rlfECGI
Evolved Cell Global Identifier (ECGI)

Figure 7:
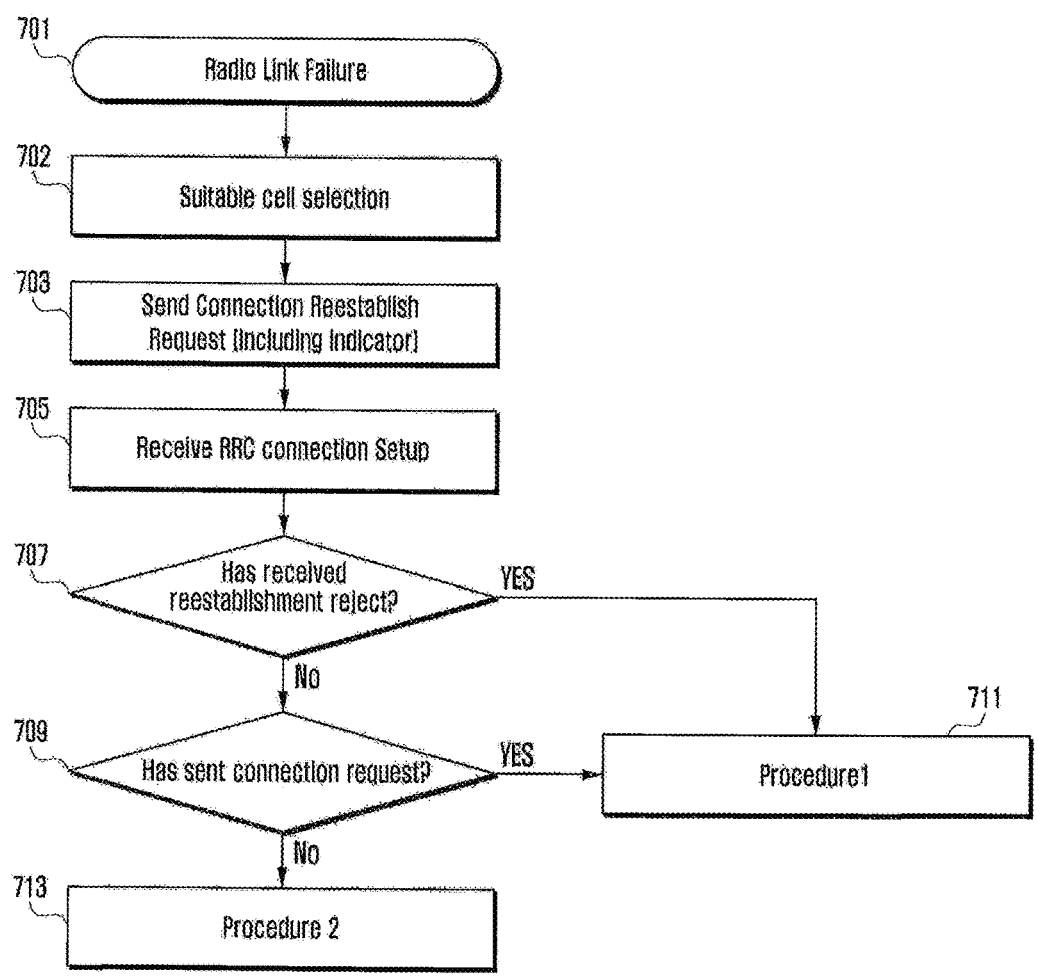
FIG. 7 is a flowchart illustrating the UE operation in the reestablishment procedure in the unprepared small cell according to an embodiment of the present invention.

FIG. 7 is a flowchart illustrating the UE operation in the reestablishment procedure in the unprepared small cell according to an embodiment of the present invention.

Referring to FIG. 7, the UE may move fast so as to pass the service areas of the small cells in a short time. If the channel condition aggravates more quickly as expected, when the source cell eNB sends the UE a handover command, and thus it is difficult to receive data from the cell at that time point, the handover command may not reach the UE. If it is recognized that the radio link to the serving cell does not work around that time point, the UE declares Radio Link Failure (RLF) at step 701. In detail, if the upper layer (i.e. Radio Resource Control (RRC)) receives 'out of sync' instruction as many times as N310 (counter value) from the physical layer in the UE, the UE starts the T310 counter and, if 'in-sync' instruction is received as many times as N311 from the physical layer or handover or reestablishment procedure is not triggered, declares RLF. If a cell having the channel quality better than a predetermined threshold at step 702, the UE sends the cell an RRC Connection Reestablishment Request message at step 703. This message may contain the following informations.

1. Identifier used by UE in last serving cell (or cell in which RLF occurred); Cell Radio Network Temporary identifier (C-RNTI)
2. Cell identifier of last serving cell (or cell in which RLF occurred) of UE (Physical Cell Identifier (PCI)
3. 16-bit message authentication information; 16-bit Message Authentication Code-Integrity (MAC-I) generated by UE using informations of last serving cell (or cell in which RLF occurred) and security key of UE in response to RRC Connection Reestablishment Request message
4. RRC Connection Reestablishment Request Cause: reconfiguration failure or handover failure.

Upon occurrence of RLF, the UE transmits the RRC connection reestablishment message including a predetermined indicator at step 703. The procedure 2 indicator is the indicator requesting the eNB to us the procedure as described with reference to FIG. 6 in which the eNB determines whether to perform the normal RRC connection reestablishment procedure (procedure 1) or the new RRC connection reestablishment procedure (procedure 2) based on whether the RRC connection reestablishment request message includes the procedure 2 indicator.

The procedure 2 indicator may be included in the RRC connection reestablishment request message as an extra bit or reported using one of the reserved value in the RRC connection reestablishment request cause (establishment cause). If the RRC connection setup message is received at step 705, the UE has two cases in the legacy method as shown in FIG. 5. After receiving the RRC connection reestablishment reject message at step 707, the UE determines whether the RRC connection setup message is received. If the RRC connection setup message is received after the receipt of the RRC connection reestablishment reject message at step 707, the UE performs the conventional procedure (procedure 1) of FIG. 5 at step 711. If the RRC connection setup message is not received after the receipt of the RRC connection reestablishment reject message at step 707, the UE determines whether the RRC connection setup message is received after transmission of the RRC connection request message at step 709. If the RRC connection setup message is received after transmission of the RRC connection request message at step 709, the UE performs the legacy connection establishment procedure (procedure 1) as shown in FIG. 5 at step 711. Otherwise if the RRC connection setup message is not received after transmission of the RRC connection request message at step 709, the UE performs the procedure (procedure 2) proposed in the present invention as shown in FIG. 6 at step 713.

Figure 8:
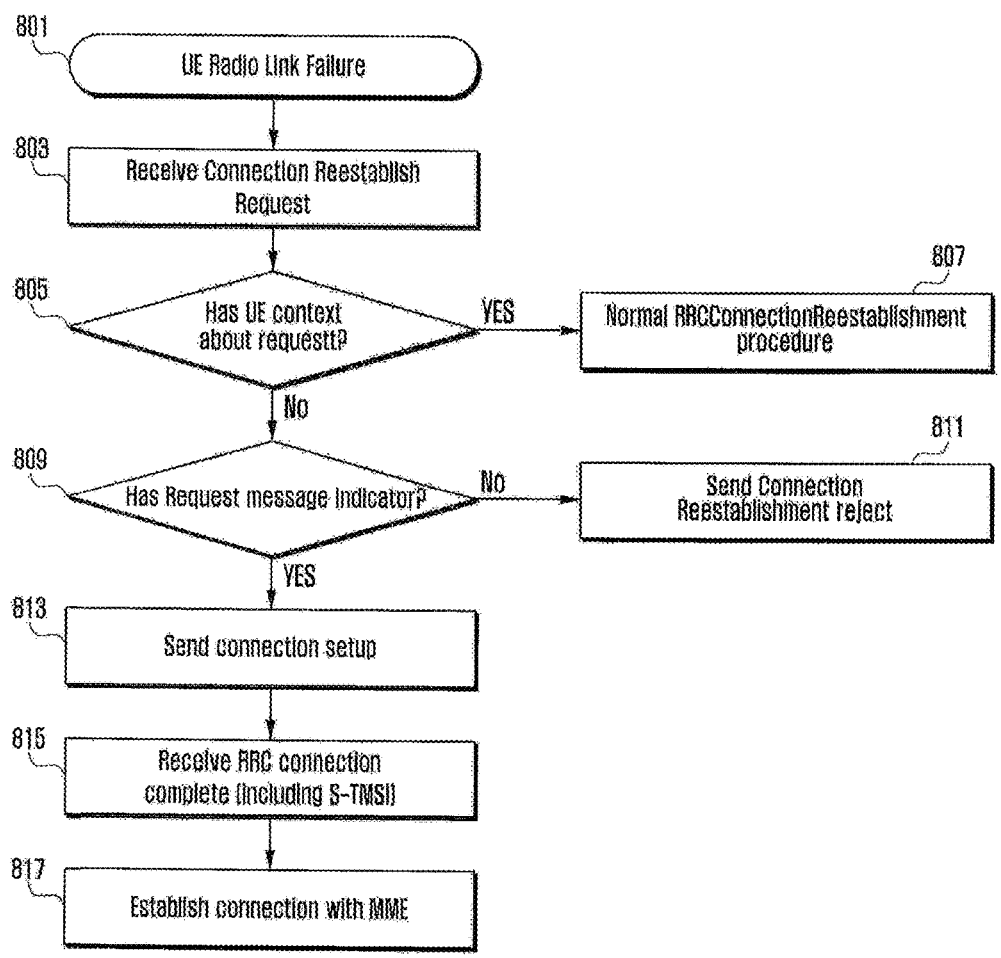
FIG. 8 is a flowchart illustrating the eNB operation in the reestablishment procedure in the unprepared small cell according to an embodiment of the present invention.

FIG. 8 is a flowchart illustrating the eNB operation in the reestablishment procedure in the unprepared small cell according to an embodiment of the present invention.

Referring to FIG. 8, when RLF occurs to the UE at step 801, the eNB receives the RRC connection reestablishment request message at step 803 and determines whether it has UE context of the corresponding UE at step 805. If it has the UE context, the eNB performs the normal RRC connection reestablishment procedure at step 807. If the eNB has no UE context of the corresponding UE and the RRC connection reestablishment request message includes the procedure 2 indicator which has been described with reference to FIG. 6, it sends the UE the RRC connection setup message at step 817 and performs the procedure 2 as described with reference to FIG. 6. Next, the eNB receives the RRC connection setup complete message transmitted by the UE at step 815. The RRC connection setup message may include S-TMSI. The eNB performs the connection setup procedure with the MME using the S-TMSI at step 817.

If the eNB has no UE context information of the corresponding UE and if the RRC connection setup message has no procedure 2 indicator at step 809, the eNB performs procedure 1 as described with reference to FIG. 5. Then the eNB sends the UE the RRC connection reestablishment reject message at step 811 and ends the procedure.

Figure 9:
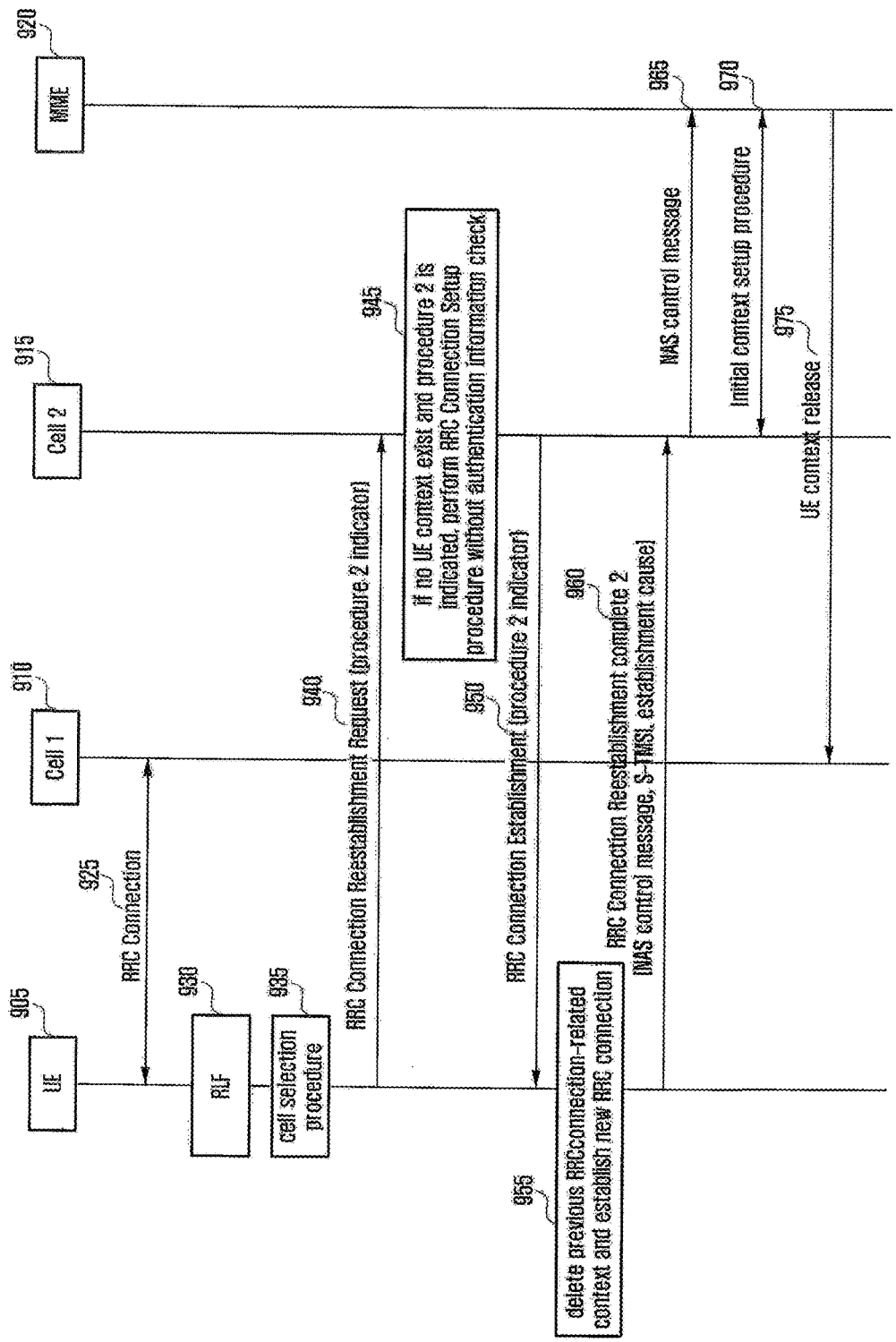
FIG. 9 is a message flow diagram illustrating the message flows among UE, eNB, and MME in the reestablishment procedure to an unprepared cell.

FIG. 9 is a message flow diagram illustrating the message flows among UE, eNB, and MME in the reestablishment procedure to an unprepared cell.

As described with reference to FIG. 6, the UE 905 in the idle state which needs an RRC connection establishes the RRC connection by transmitting the RRC connection request message at step 925. The UE declares RLF at step 930 when it is determined that receiving signal is impossible any longer due to the drop of signal power from the first cell 910. Afterward, if the second cell 915 of which channel quality is greater than a predetermined threshold is found, the UE 905 attempts attach to the second cell through the cell reconnection procedure. The UE sends the second cell the RRC Connection Reestablishment Request message including last serving cell PCI, UE identifier (C-RNTI), MAC-I, and RRC connection reestablishment request cause, e.g. reconfiguration failure and handover failure at step 940. This message may further include the procedure 2 indicator which has been described with reference to FIG. 6. If the RRC connection reestablishment request message includes the procedure 2 indicator, the second cell 915 performs the RRC Connection Setup procedure immediately without checking authentication information at step 945. The second cell 915 sends the UE the RRC Connection Setup message for procedure 2 at step 950. If the message is received, the UE deletes the previous RRC connection-related context information and establishes a new RRC connection according to the UE operation procedure of FIG. 7 at step 955. The UE transmits the RRC connection complete message including NAS control message, S-TMSI, and establishment cause for completing RRC connection establishment at step 960. The second cell 915 sends the MME 920 the NAS control message included in the RRC connection complete message at step 965. The MME 920 sends the second cell 915 an Initial Context Setup Request message to perform the initial context setup procedure at step 970. This message may include the UE context information and E-RAB context. The UE context information may include security, roaming restriction, and UE capability information. The second cell 915 sends the MME an Initial context setup complete message in reply to complete the initial context setup procedure. The MME 920 sends the first cell 910 a UE context release message to release the UE context information stored in the first cell 910 at step 975, resulting in the end of the procedure.

Figure 10:
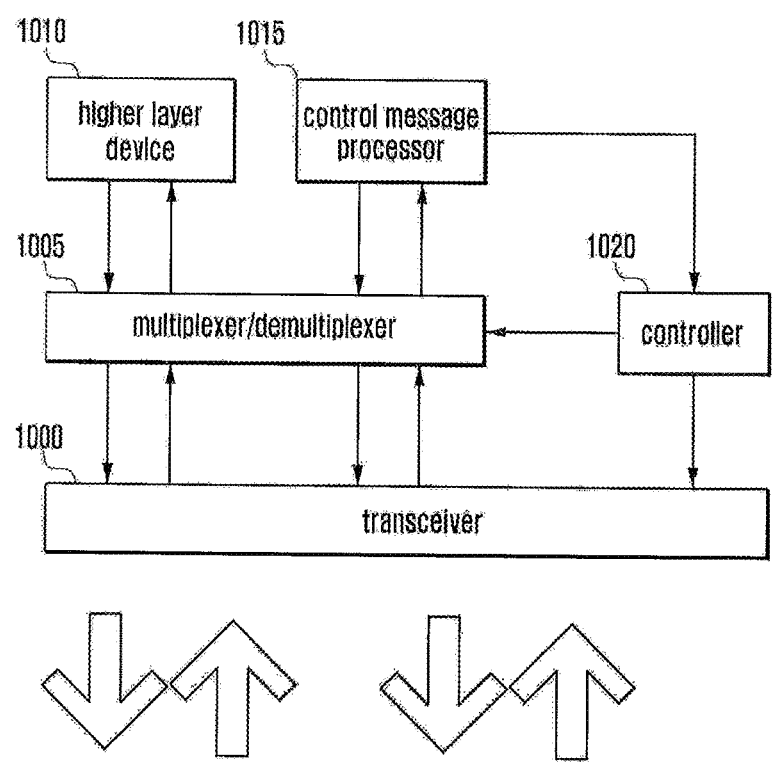
FIG. 10 is a block diagram illustrating a configuration of the UE according to an embodiment of the present invention.

FIG. 10 is a block diagram illustrating a configuration of the UE according to an embodiment of the present invention.

The UE transmits/receives data generated at the higher layer 1010 and control messages generated by the control message processor 1015. In the case that the UE transmits control signal and data to the eNB, the controller 1020 controls such that the control signals and data are multiplexed by the multiplexer/demultiplexer 1005 and then transmitted by the transceiver 1000. In the reception mode, the controller 1020 of the UE controls such that the physical signal received by the transceiver 1000 is demultiplexed by the multiplexer/demultiplexer 1005 and then delivered to the higher layer 1010 or the control message processor 1015 according to the message information.

Figure 11:
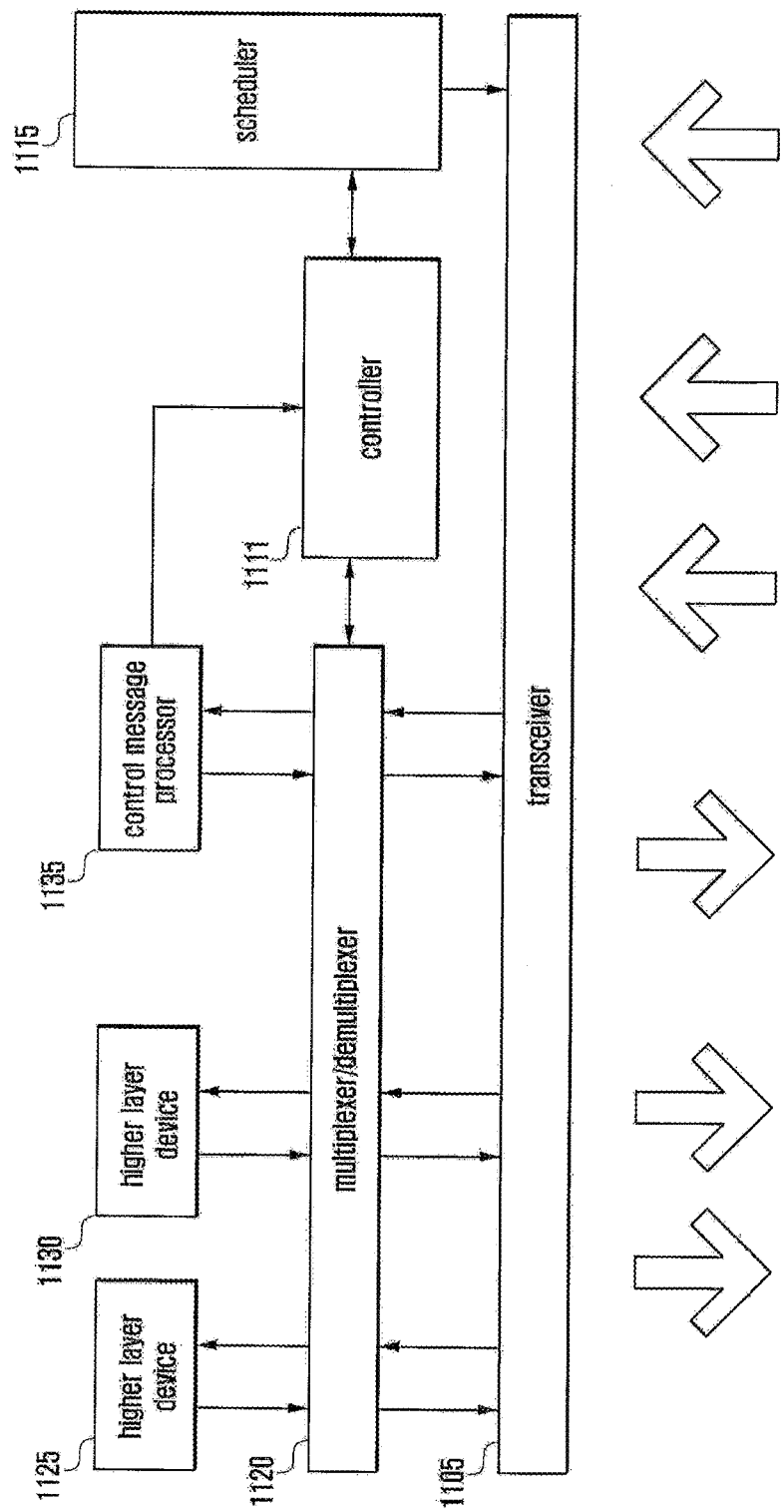
FIG. 11 is a block diagram illustrating a configuration of the eNB according to an embodiment of the present invention.

FIG. 11 is a block diagram illustrating a configuration of the eNB according to an embodiment of the present invention.

As shown in FIG. 11, the eNB includes a transceiver 1105, a controller 1110, a multiplexer/demultiplexer 1120, a control message processor 1135, higher layer processors 1125 and 1130, and a scheduler 1115. The transceiver 1105 transmits data and predetermined control signal on a downlink carrier and receives data and predetermined control signal on an uplink carrier. In the case that multiple carriers are configured, the transceiver 1105 performs data and control signal transmission/reception on the multiple carriers. The multiplexer/demultiplexer 1120 multiplexes the data generated by the higher layer processors 1125 and 1130 and/or the control message processor 1135 or demultiplexes the data received by the transceiver 1105 and delivers the data to the appropriate higher layer processors 1125 and 1130, control message processor 1135, and/or the controller 1110. The control unit 1110 determines whether to apply band-specific measurement gap to specific UE and whether to include the configuration information in the RRC connection Reconfiguration message. The control message processor 1135 generates the RRC Connection Reconfiguration message to be transmitted to the UE to the higher layer. The higher layer processors 1125 and 1130 may be established by UE by service to process data generated by the user services such as File Transfer Protocol (FTP) or Voice over Internet Protocol (VoIP) and deliver the processed data to the multiplexer/demultiplexer 1120 or processes the data from the multiplexer/demultiplexer 1120 and deliver the processed data to the service applications of the higher layer. The scheduler 1115 allocates transmission resource to the UE at an appropriate time point in consideration of the buffer state, channel state, and active time of the UE and controls the transceiver to process the signal transmitted by the UE or to be transmitted to the UE.

It is obvious to those skilled in the art that the present invention can be embodied in various forms without departing from the spirit and scope of the present invention.

Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

The invention claimed is:

1. A method by a terminal in a wireless communication system, the method comprising:
   receiving, from a base station, a first parameter indicating a time duration for determining a mobility state of the terminal and a second parameter indicating a number of cell changes for determining the mobility state of the terminal;
   identifying that there is mobility history information available in the terminal;
   transmitting, to the base station, a first message to confirm a completion of a radio resource control (RRC) connection establishment, wherein:
      the first message includes first information determined based on the identification and second information determined based on the first parameter and the second parameter,
      the first information indicates that the terminal has the mobility history information, and
      the second information indicates the mobility state of the terminal determined in a predetermined time period before the terminal goes into an RRC connected state;
   receiving, from the base station, a second message generated based on the first information, the second message requesting a report of the mobility history information; and
   transmitting, to the base station, a third message including the mobility history information in response to the second message.

2. The method of claim 1, wherein the mobility history information comprises a cell identity of a visited cell and a time spent in the visited cell.

3. The method of claim 1, wherein the mobility history information comprises information on a plurality of cells that the terminal recently visited.

4. The method of claim 1, wherein the second information indicates a most recently determined mobility state of the terminal before the terminal goes into the RRC connected state.

5. A method by a base station in a wireless communication system, the method comprising:
   transmitting, to a terminal, a first parameter indicating a time duration for determining a mobility state of the terminal and a second parameter indicating a number of cell changes for determining the mobility state of the terminal;
   receiving, from the terminal, a first message to confirm a completion of a radio resource control (RRC) connection establishment, wherein:
      the first message includes first information determined based on an identification that there is mobility history information available in the terminal and second information determined based on the first parameter and the second parameter,
      the first information indicates that the terminal has the mobility history information, and
      the second information indicates the mobility state of the terminal determined in a predetermined time period before the terminal goes into an RRC connected state;
   transmitting, to the terminal, a second message generated based on the first information, the second message requesting a report of the mobility history information; and
   receiving, from the terminal, a third message including the mobility history information in response to the second message.

6. The method of claim 5, wherein the mobility history information comprises a cell identity of a visited cell and a time spent in the visited cell.

7. The method of claim 5, wherein the mobility history information comprises information on a plurality of cells that the terminal recently visited.

8. The method of claim 5, wherein the second information indicates a most recently determined mobility state of the terminal before the terminal goes into the RRC connected state.

9. A terminal in a wireless communication system, the terminal comprising:
   a transceiver configured to transmit and receive a signal; and
   a processor configured to:
      receive, from a base station, a first parameter indicating a time duration for determining a mobility state of the terminal and a second parameter indicating a number of cell changes for determining the mobility state of the terminal,
      identify that there is mobility history information available in the terminal,
      transmit, to the base station, a first message to confirm a completion of a radio resource control (RRC) connection establishment, wherein:
         the first message includes first information determined based on the identification and second information determined based on the first parameter and the second parameter,
         the first information indicates that the terminal has the mobility history information, and
         the second information indicates the mobility state of the terminal determined in a predetermined time period before the terminal goes into an RRC connected state,
      receive, from the base station, a second message generated based on the first information, the second message requesting a report of the mobility history information, and
      transmit, to the base station, a third message including the mobility history information in response to the second message.

10. The terminal of claim 9, wherein the mobility history information comprises a cell identity of a visited cell and a time spent in the visited cell.

11. The terminal of claim 9, wherein the mobility history information comprises information on a plurality of cells that the terminal recently visited.

12. The terminal of claim 9, wherein the second information indicates a most recently determined mobility state of the terminal before the terminal goes into the RRC connected state.

13. A base station in a wireless communication system, the base station comprising:
   a transceiver configured to transmit and receive a signal; and
   a processor configured to:
      transmit, to a terminal, a first parameter indicating a time duration for determining a mobility state of the terminal and a second parameter indicating a number of cell changes for determining the mobility state of the terminal, receive, from the terminal, a first message to confirm a completion of a radio resource control (RRC) connection establishment, wherein:
   the first message includes first information determined based on an identification that there is mobility history information available in the terminal and second information determined based on the first parameter and the second parameter, and
   the first information indicates that the terminal has the mobility history information, and
   the second information indicates the mobility state of the terminal determined in a predetermined time period before the terminal goes into an RRC connected state,
transmit, to the terminal, a second message generated based on the first information, the second message requesting a report of the mobility history information, and
receive, from the terminal, a third message including the mobility history information in response to the second message.

14. The base station of claim 13, wherein the mobility history information comprises a cell identity of a visited cell and a time spent in the visited cell.

15. The base station of claim 13, wherein the mobility history information comprises information on a plurality of cells that the terminal recently visited.

16. The base station of claim 13, wherein the second information indicates a most recently determined mobility state of the terminal before the terminal goes into the RRC connected state.

* * * * *